(No Model.)
A. KREUSLER.
PROCESS OF TREATING BEER AND ANALOGOUS LIQUIDS.
No. 489,018. Patented Jan. 3, 1893.
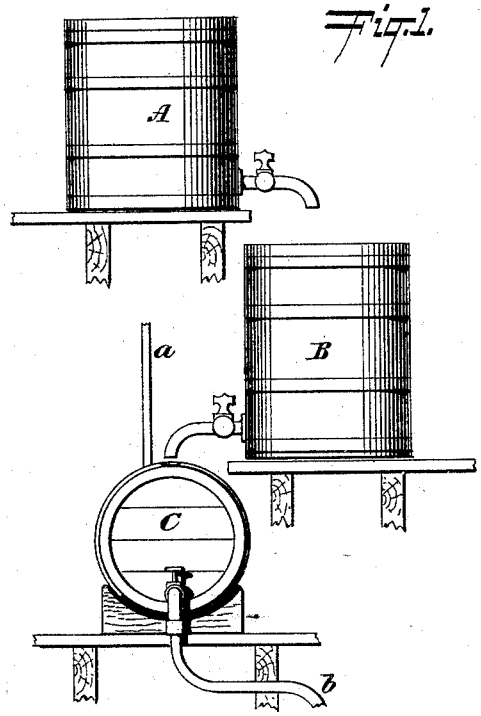
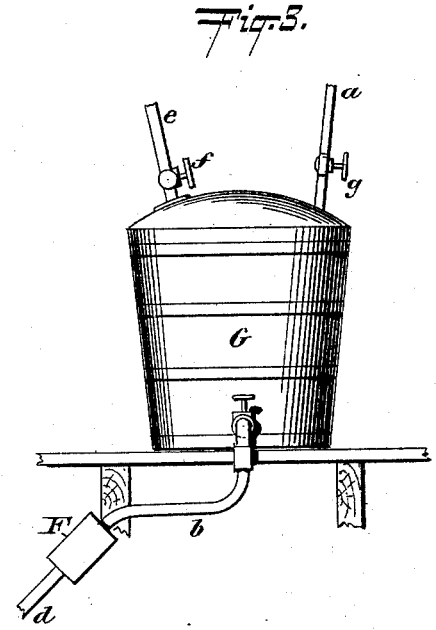
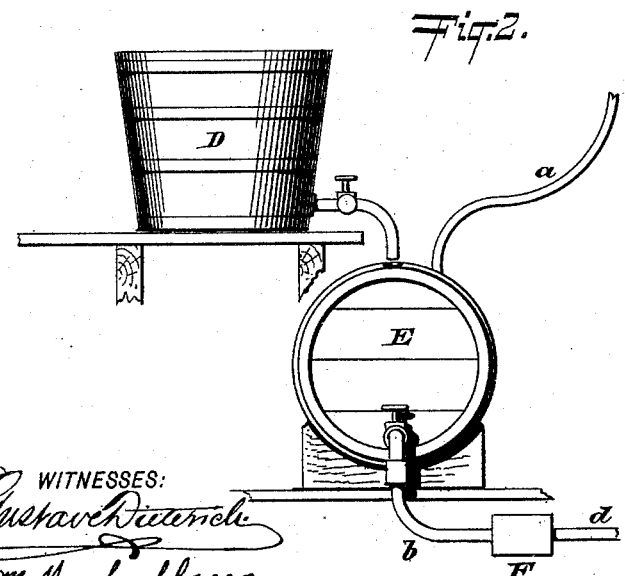
WITNESSES:
INVENTOR:
Arnold Kreusler,
BY Briesen & Knauth
his ATTORNEYS.

UNITED STATES PATENT OFFICE.

ARNOLD KREUSLER, OF KREISCHERVILLE, ASSIGNOR TO HIMSELF, AND AUGUST ZINSSER, OF NEW YORK, N. Y.

PROCESS OF TREATING BEER AND ANALOGOUS LIQUIDS.

SPECIFICATION forming part of Letters Patent No. 489,018, dated January 3, 1893.

Application filed May 13, 1892. Serial No. 432,858. (No specimens.)

*To all whom it may concern:*

Be it known that I, ARNOLD KREUSLER, residing at Kreischerville, Staten Island, Richmond county, and State of New York, have invented an Improved Process of Treating Beer and Analogous Liquids, of which the following is a specification.

The object of this invention is to simplify the process of making beer and analogous fermented liquids and to produce such liquid to the consumer at any desired stage of fermentation.

In the description of my improved process I prefer to make reference to the accompanying drawings, in which Figure 1 represents apparatus heretofore usually employed in the manufacture of beer, whereas Figs. 2 and 3 are side views of apparatus which may be profitably employed according to my present invention.

As beer was heretofore made, the wort was first put into a fermenting vat A (Fig. 1) and there allowed to ferment until the fermentation stopped for want of fermentable matter, at which stage the extractive substances are reduced to, say, four per centum. The liquid was then drawn into a vat B, called the "ruh vat" for settlement, so as to separate the yeast and other matter from the clear liquor. This process or stage requires from three to four months. The ruh beer, when sufficiently clear, was then conveyed into the kraeusen cask C, in which cask about two-thirds of the contents were from the "ruh vat" and the remaining one-third was wort in incipient stage of fermentation from fermenting vats, the said wort containing from three to four times more fermentable extract than the beer from the ruh vat. In the kraeusen cask carbonic acid gas was allowed to generate, a stand-pipe *a* being supplied to the kraeusen cask for the purpose of regulating the pressure of such gas; and finally, when in proper condition, the contents of the kraeusen cask were drawn off through a faucet and pipe *b* into the kegs which go to the consumer; this kraeusen process lasted from ten to twenty days.

According to my invention, which can be carried out in apparatus such as shown in Fig. 2, the wort is first placed into a vat D and there permitted to ferment down until about five or six per cent. of extractive substances remain. What I mean to say is that, according to my invention, the fermentation is not allowed in the vat D to take place, or need not be allowed in said vat to take place, to the same extent in which it must necessarily take place in the vat A in the old process. After having been fermented down to, the limited extent stated, the contents of the vat D are conveyed directly into the racking cask E without further addition of kraeusen beer or beer wort, because the liquid which I fill into the cask E has the required percentage of extractive substances left to generate by further fermentation sufficient quantities of carbonic acid gas, which in the cask C of the old process had to be made up by adding to the ruh beer about one-third of wort, or kraeusen beer. In the cask E fermentation is allowed to continue to any desired stage and carbonic acid gas allowed to generate, a stand-pipe *a* being supplied to said cask for the purpose of regulating the pressure of the gas; and finally when the exact stage of fermentation desired has been attained, the beer is taken from the cask E through a pipe *b* into a filter F, and from the filter through a pipe *d* to the keg which goes to the consumer.

Instead of using the vat D and cask E, as shown in Fig. 2, I can carry out my process also in a single vessel, as in Fig. 3. This vessel G first receives the wort and the extractive substances, and has an opening *e* which can be controlled by a cock *f*, so that fermentation to the desired extent may be allowed to proceed therein, the same as in the ordinary open vat A of the old process. When the desired stage of fermentation has been obtained, say down to about five per centum of extractive matter, the cock *f* is closed and the gas pipe *a* opened by means of the cock *g*, and the generation of gas permitted to take place under the desired degree of pressure. Finally the liquid is taken from the vessel G through a pipe *b* into a filter F, and thence by a pipe *d* into a keg which goes to the consumer.

It will be perceived from the above that my invention consists mainly in allowing the fermentation of beer or analogous liquids to take place in an open vat until the sugar and other extractive matters that are transformed into alcohol and other substances by the act of fermentation shall have been eliminated to the specifically desired extent, but not to the stage in which the same are eliminated in the ordinary fermenting vats; in other words, in ordinary fermenting vats said extractive substances are contained in the wort first at the rate of about twelve per centum, and are, I repeat, fermented down to about four per centum; whereas the kraeusen cask C, in order to produce the desired liquid, must receive its contents in a condition in which the extractive substances are at the rate of more than four per centum. Hence the necessity in previous brewing of adding to the kraeusen cask wort, or partly fermented wort, to the ruh beer so as to make up an excess over four per centum of fermenting matter. These figures are only given as examples: they may be modified, and frequently are, according to the circumstances of each individual case.

By my invention I am enabled to do away entirely with the ruh vat and also with the delay caused by the retention of beer therein, saving much time. I am also enabled to do away with the necessity of mixing the contents of the ruh vat with wort having a greater proportion of fermentive substances than was in the ruh vat. And finally, I produce for the consumer a beer which may contain any desired proportion of unfermented fermentive substances.

What I claim and desire to secure by Letters Patent is:

The process herein described of making beer or analogous substances, which process consists in first subjecting the wort to an incomplete first fermentation, and in then, without addition of kraeusen or fermentable substances, subjecting it in a closed vessel to the process of gas generation and permeation and arresting the process before complete fermentation takes place, by filtering the result and filling it into kegs, substantially as described.

ARNOLD KREUSLER.

Witnesses:
MAURICE BLOCK,
JAS. L. SUYDAM.